US009752773B2

(12) United States Patent
Levasseur et al.

(10) Patent No.: US 9,752,773 B2
(45) Date of Patent: Sep. 5, 2017

(54) APPARATUS AND METHOD OF CONTROLLING THE THERMAL PERFORMANCE OF AN OXYGEN-FIRED BOILER

(75) Inventors: Armand A. Levasseur, Windsor Locks, CT (US); Shin G. Kang, Simsbury, CT (US); James R. Kenney, Windsor, CT (US); Carl D. Edberg, Stafford Springs, CT (US); David G. Turek, South Windsor, CT (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 713 days.

(21) Appl. No.: 13/298,147

(22) Filed: Nov. 16, 2011

(65) Prior Publication Data
US 2012/0145052 A1    Jun. 14, 2012

Related U.S. Application Data

(60) Provisional application No. 61/414,175, filed on Nov. 16, 2010.

(51) Int. Cl.
*F23B 80/02* (2006.01)
*F23C 9/00* (2006.01)
(Continued)

(52) U.S. Cl.
CPC .................. *F23C 9/00* (2013.01); *F23C 5/12* (2013.01); *F23L 7/007* (2013.01); *F23L 9/04* (2013.01);
(Continued)

(58) Field of Classification Search
CPC   Y02E 20/322; F23L 9/04; F23L 2900/07001; F23L 7/007; F23C 2202/30; F23C 9/00
(Continued)

(56) References Cited

U.S. PATENT DOCUMENTS 2,980,082 A  *  4/1961  Firl .............................. 122/459
3,927,627 A  * 12/1975  Brunn ..................... F23L 15/00
                                                              110/342
(Continued)

FOREIGN PATENT DOCUMENTS

DE    10 2008 009 129    8/2009
EP         1 517 085      3/2005
(Continued)

OTHER PUBLICATIONS

Japanese Notification of Reasons for Refusal corresponding to JP Appln. No. 2013-539984, dated Feb. 3, 2014.

*Primary Examiner* — Avinash Savani
*Assistant Examiner* — Deepak Deean
(74) *Attorney, Agent, or Firm* — GE Global Patent Operation; Stephen G. Midgley

(57) ABSTRACT

Disclosed herein is a method of controlling the operation of an oxy-fired boiler; the method comprising combusting a fuel in a boiler; producing a heat absorption pattern in the boiler; discharging flue gases from the boiler; recycling a portion of the flue gases to the boiler; combining a first oxidant stream with the recycled flue gases to form a combined stream; splitting the combined stream into several fractions; and introducing each fraction of the combined stream to the boiler at different points of entry to the boiler.

31 Claims, 9 Drawing Sheets

(51) Int. Cl.
F23C 5/08 (2006.01)
F23L 7/00 (2006.01)
F23L 9/04 (2006.01)
F23N 1/02 (2006.01)

(52) U.S. Cl.
CPC ........ *F23N 1/022* (2013.01); *F23C 2201/101* (2013.01); *F23C 2202/30* (2013.01); *F23L 2900/07001* (2013.01); *Y02E 20/322* (2013.01); *Y02E 20/344* (2013.01)

(58) Field of Classification Search
USPC .............................................. 431/116
See application file for complete search history.

(56) References Cited

U.S. PATENT DOCUMENTS

| | | | |
|---|---|---|---|
| 8,478,446 B2* | 7/2013 | Kloosterman et al. | 700/274 |
| 8,555,796 B2* | 10/2013 | D'Agostini | 110/204 |
| 2002/0166484 A1* | 11/2002 | Zamansky | F23C 6/047 110/342 |
| 2008/0160464 A1* | 7/2008 | Ghani et al. | 431/9 |
| 2008/0286707 A1* | 11/2008 | Panesar | F23L 7/007 431/10 |
| 2009/0013868 A1* | 1/2009 | Darde | B01D 53/002 95/42 |
| 2009/0013871 A1* | 1/2009 | Darde | B01D 53/04 95/129 |
| 2009/0249988 A1* | 10/2009 | Davidian | F23C 9/00 110/345 |
| 2009/0272300 A1 | 11/2009 | Yamada et al. | |
| 2009/0277363 A1* | 11/2009 | Shibata | F23C 9/003 110/186 |
| 2010/0077945 A1* | 4/2010 | Hendershot | F23C 6/047 110/345 |
| 2010/0077946 A1* | 4/2010 | D'Agostini | 110/345 |
| 2010/0077947 A1* | 4/2010 | Hack | F23C 9/003 110/345 |
| 2010/0081099 A1* | 4/2010 | Kloosterman | F22B 35/00 431/11 |
| 2010/0107940 A1* | 5/2010 | Shibata | F23C 9/003 110/347 |
| 2011/0132243 A1* | 6/2011 | Terushita | F22B 35/002 110/345 |

FOREIGN PATENT DOCUMENTS

| | | |
|---|---|---|
| EP | 2 116 765 | 11/2009 |
| EP | 2 251 599 | 11/2010 |
| JP | 6832207 U | 3/1983 |
| JP | S61-285304 | 12/1986 |
| JP | S62-237219 | 10/1987 |
| JP | 4-165204 | 10/2008 |
| JP | 2009-270753 | 11/2009 |
| JP | 2010-54144 | 3/2010 |
| JP | 2010-145028 | 7/2010 |
| WO | 2008/142654 | 11/2008 |

* cited by examiner

APPARATUS AND METHOD OF CONTROLLING THE THERMAL PERFORMANCE OF AN OXYGEN-FIRED BOILER

CROSS REFERENCE TO RELATED APPLICATIONS

This disclosure claims priority to U.S. Provisional Application No. 61/414,175 filed on Nov. 16, 2010, the entire contents of which are incorporated herein by reference.

STATEMENT REGARDING FEDERALLY SPONSORED RESEARCH OR SUPPORT

The United States Government has rights in this invention pursuant to a grant having contract No. DE-NT0005290 from the U.S. Department of Energy/National Energy Technology Laboratory (NETL).

TECHNICAL FIELD

This disclosure relates generally to oxy-fired boilers, and more specifically to an apparatus and method of controlling the thermal performance of an oxy-fired boiler by controlling the distribution of oxygen and/or recycled flue gas to the boiler.

BACKGROUND

Oxy-combustion is being developed for carbon dioxide capture and sequestration in fossil fuel fired power plants. The concept of oxy-combustion (also sometimes referred to as 'oxyfuel' and 'oxy-firing') is to replace combustion air with a mixture of oxygen and recycled flue gas, thereby creating a high carbon dioxide content flue gas stream that can be more simply processed for sequestration. A simplified exemplary schematic of the oxy-combustion process for pulverized coal (pc) power plants is shown in prior art depicted in FIG. 1.

FIG. 1 depicts an oxy-combustion system 100, comprising an air separation unit 102, a boiler 104, a pollution control system 106 and a gas processing unit 108. The air separation unit 102 is located upstream of the boiler 104, which is located upstream of the pollution control system 106 and the gas processing unit 108. The pollution control system 106 is located upstream of the gas processing unit 108. Gas recycle is shown taken after the pollution control system, but could be taken from any location between the boiler and the gas processing unit.

The boiler 104 may be a tangentially fired boiler (also known as a T-fired) or a wall fired boiler. T-firing is different from wall firing in that it utilizes burner assemblies with fuel admission compartments located at the corners of the boiler furnace, which generate a rotating fireball that fills most of the furnace cross section. Wall firing (not shown), on the other hand, utilizes burner assemblies that are perpendicular to a side (of the shell) of the boiler.

FIG. 2 depicts a tangentially fired boiler 104. Tangentially fired boilers have a rectangular cross-section and have burner assemblies 105 positioned at the corners. Fuel and transport air are introduced into the boiler 104 via the burner assemblies 105 and are directed tangentially to an imaginary circle located at the center of the furnace and with a diameter greater than zero. This generates a rotating fireball that fills most of the furnace cross section. The fuel and air mixing is limited until the streams join together in the furnace volume and generate a rotation. This has often been described, as "the entire boiler is the burner." Global boiler aerodynamics and mixing is much more important to the combustion process and the resulting boiler performance during T-firing as compared with wall-firing. During wall-firing, fuel and air/oxygen mixing occurs in or near the burners and less mixing occurs in the boiler.

With reference now once again to FIG. 1, in one method of operating the oxy-combustion system 100, oxygen is first separated from nitrogen in the air separation unit 102. The nitrogen is discharged separately from the air separation unit. The air separation unit 102 extracts oxygen from the atmosphere.

The oxygen is then discharged from the air separation unit 102 to combine with recycled flue gas, the combination of which is fed to the boiler 104. The boiler 104 uses the oxygen present in the flue gas stream to combust a fuel (e.g., coal, oil, or the like) to generate heat and flue gases. As a result of combusting the fuel with oxygen instead of with air, the flue gas produced has a high carbon dioxide content. The other constituents of the flue gas are water vapor and small amounts of oxygen, nitrogen, and pollutants such as sulfur oxides, nitrogen oxides, and carbon monoxide. Removing the water and other components produces a very pure carbon dioxide stream suitable for sequestration or other use.

The heat is used to generate steam, which may be used to drive a generator (not shown) to produce electricity, while the flue gases are discharged to the pollution control system 106 where particulate matter and other pollutants (e.g., NOx, SOx, and the like) are removed. A portion of the purified flue gases is recycled to the boiler 104 as shown in FIG. 1. The remaining flue gases (that substantially comprises carbon dioxide) are discharged to the gas processing unit 108 from where it is sequestered.

If a large amount of recycled flue gases relative to the amount of oxygen is fed to the boiler 104 to effect combustion, the combustion temperatures reached in the boiler are not sufficient to facilitate the combustion of all of the fuel. In addition, larger equipment is needed to recycle such large amounts of flue gases. On the other hand, burning the fuel with pure oxygen generally produces flame temperatures much too high for practical boiler materials, so a portion of the high-carbon dioxide flue gas is used to dilute the oxygen and moderate the boiler temperature.

The amount of oxygen added to the recycled flue gas is based on the amount of fuel combusted in the boiler. The fuel uses a certain amount of oxygen in addition to some amount of excess oxygen to ensure complete combustion. The addition of the oxidant stream into the boiler at a single concentration in the boiler has certain disadvantages. One of these disadvantages is that the heat release or flux profile (hereinafter "heat release profile") in the boiler is not optimized to produce the highest overall furnace heat absorption while maintaining acceptable conditions for tube metal temperatures, ash deposition and fireside corrosion that impact operating reliability and maintenance costs. It is therefore desirable to devise a methodology for introducing the oxidant stream into the boiler in such a manner so as to optimize the heat release profile in the boiler at different positions in the boiler so as to optimize the thermal performance of the boiler, to reduce ash deposition and fireside corrosion, and to prevent slagging and corrosion in the furnace.

SUMMARY

Disclosed herein is a method comprising combusting a fuel in a boiler; producing a heat absorption pattern in the boiler; discharging flue gases from the boiler; recycling a portion of the flue gases to the boiler; combining a first oxidant stream with the recycled flue gases to form a first combined stream; splitting the first combined stream into several fractions; mixing each fraction of the first combined stream with a second oxidant stream to form a plurality of fractions of a second combined stream; and introducing each fraction of the plurality of fractions of the second combined stream to the boiler at different points of entry to the boiler.

Disclosed herein too is a method comprising combusting a fuel in a boiler; producing a heat absorption pattern in the boiler; discharging flue gases from the boiler; recycling a portion of the flue gases to the boiler; splitting the flue gases into a plurality of different streams before introducing them into the boiler; and controlling the flow rate of each of the plurality of streams into the boiler in order to.

DETAILED DESCRIPTION

Disclosed herein is an oxyfuel combustion system where oxygen is combined with or added to a recycled flue gas stream to form an oxidant stream that is introduced into a boiler. Disclosed herein too is a method for introducing and controlling the ratio of the oxygen and recycled flue gas of an oxidant stream at various points in a boiler so as to define and/or vary the heat release profile in the boiler to improve the thermal performance of the boiler, to reduce ash deposition and fireside corrosion, and/or to prevent slagging in the furnace.

The methods disclosed herein involve varying the amount, proportion and/or distribution of oxygen, the amount, proportion and/or distribution of recycled flue gases, or both the amount, proportion and/or distribution of both oxygen and recycled flue gases in a combined stream that is fed to various inputs to the boiler, an input stream provided to the boiler and/or various zones of the boiler. For example, the volume of oxygen sufficient for the desired amount of combustion of the fuel provided to the boiler in accordance with desired stoichiometric parameters may be portioned or distributed to different zones or locations of the boiler to provide a desired heat release profile in the boiler. Further, the recycled flue gas and/or volume of oxygen may be proportioned and/or distributed to different areas within a zone of the boiler to provide a desired heat release profile in that zone. Furthermore, the proportion and/or distribution of addition of a volume or proportion of oxygen and/or recycled flue gas to an input stream to the boiler may be controlled to provide a desired heat release profile.

Figure 1:
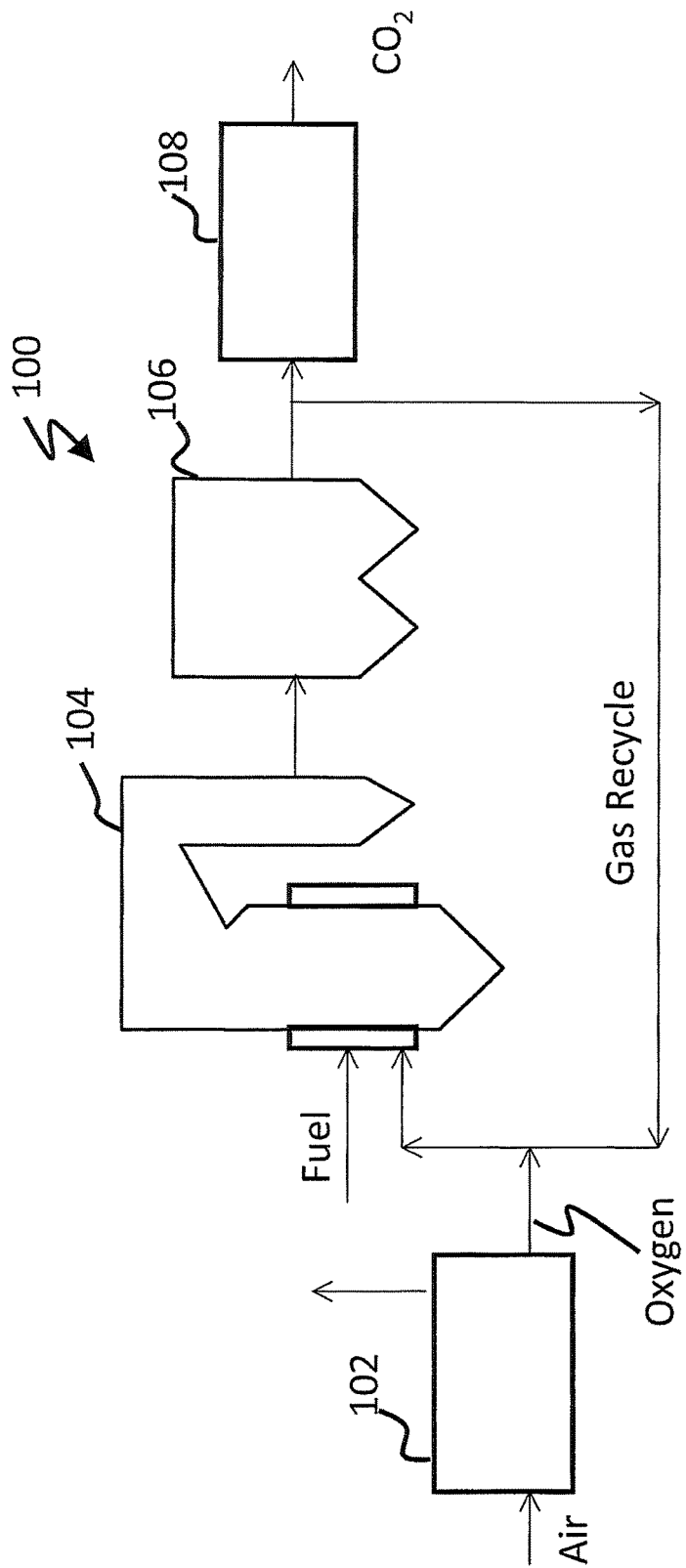
FIG. 1 represents the prior art and depicts a combustion system where flue gases are recycled to the boiler.
Figure 2:
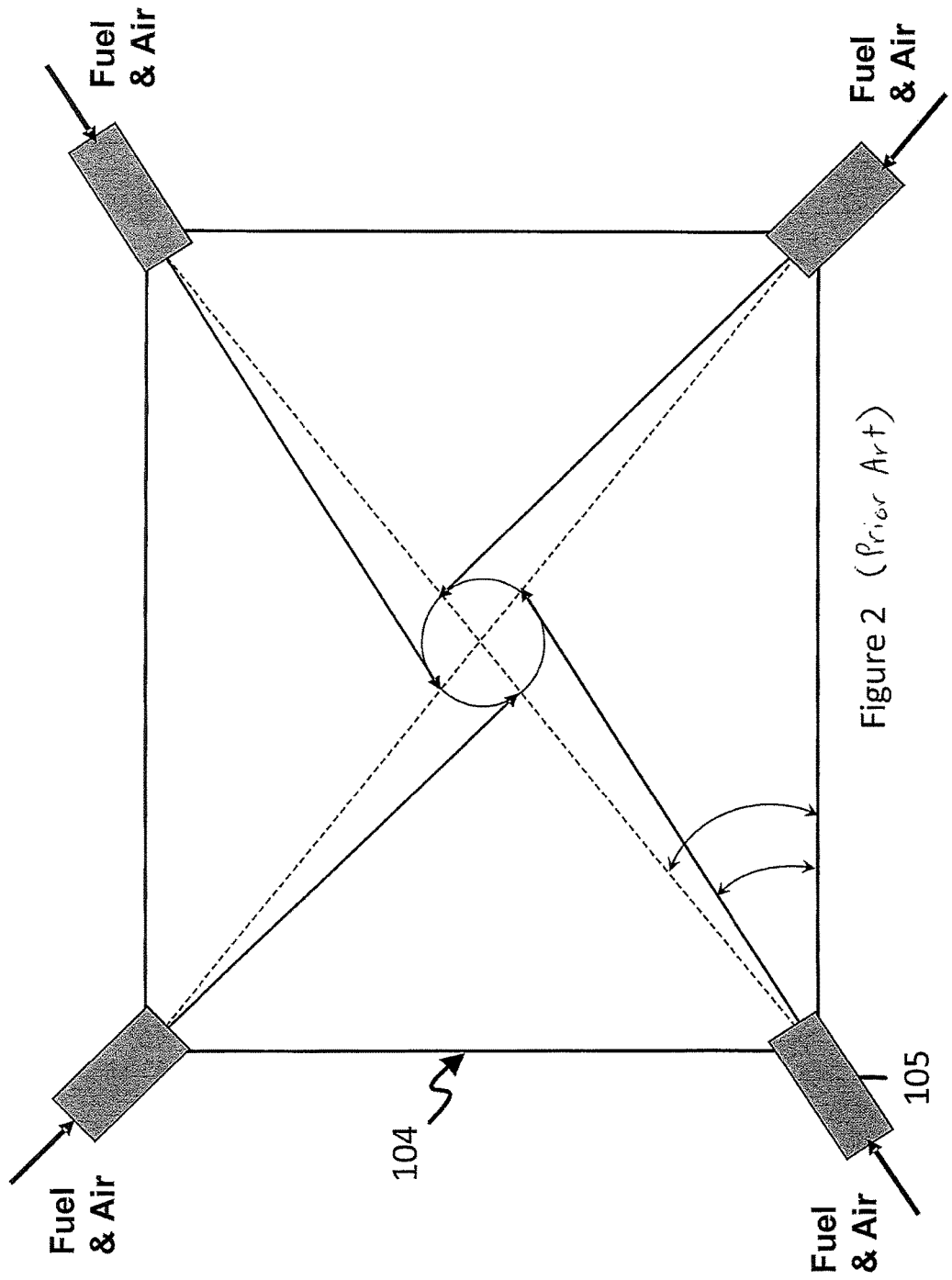
FIG. 2 depicts a tangentially fired boiler.
Figure 3:
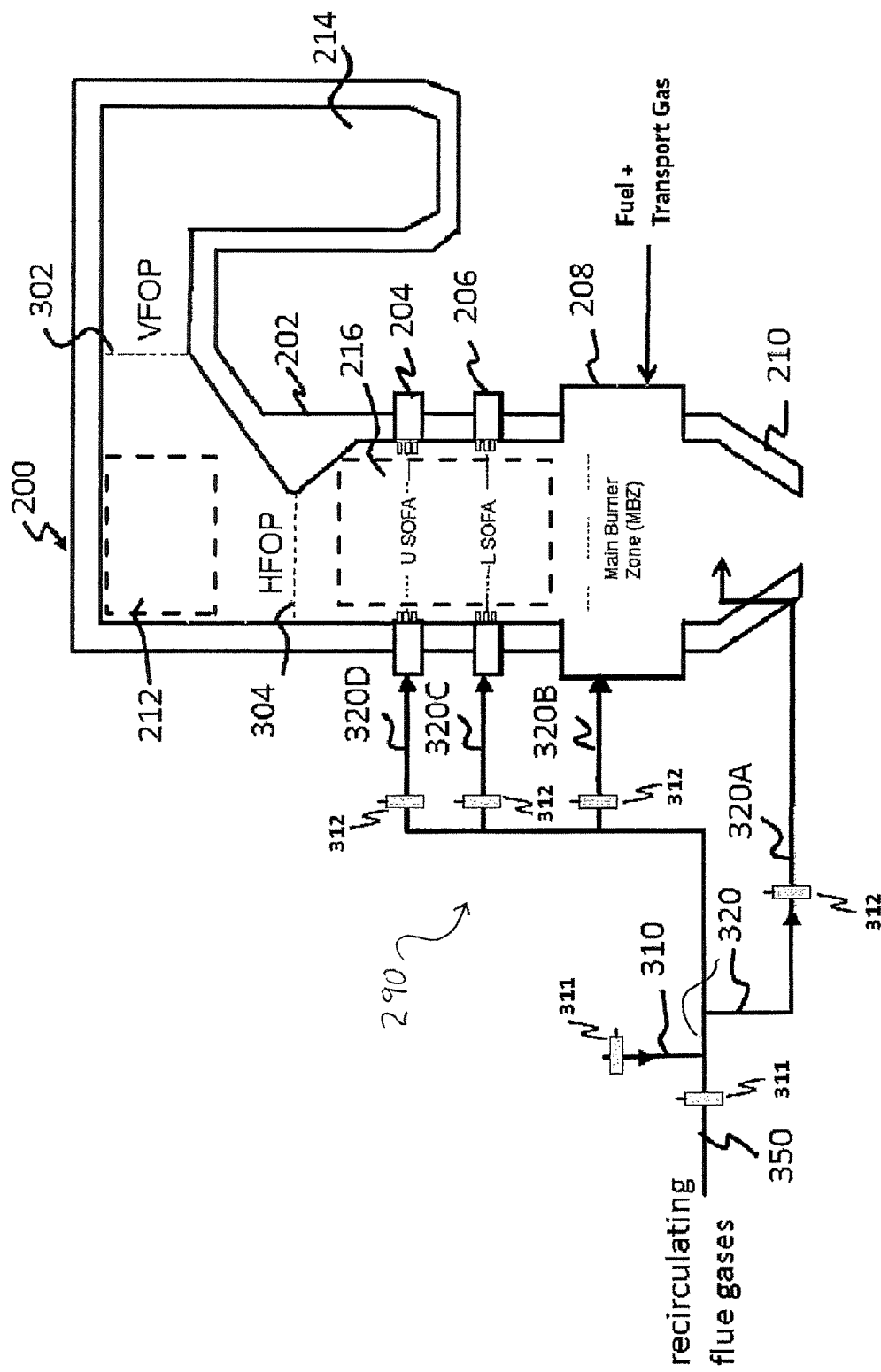
FIG. 3 is a depiction of the various points at which a combined stream that comprises a first oxidant stream (that comprises substantially oxygen) and a second stream (that comprises substantially recycled flue gases) can be introduced into the boiler.

In one embodiment similar to that shown in FIG. 3, a system and method comprises supplying a first combined stream of recycled flue gas and a first oxidant stream to different sections or zones of the boiler. The first combined stream may be supplied to a hopper zone, the windbox zone and/or one or more overfired oxidant compartments at different volumes, which are each controlled by a respective fluid flow control device. In this embodiment, the ratio of oxygen to the recycled flue gas is constant in any of the zones of the boiler to which it is introduced, however, the distribution of the first combined stream is controlled by providing varying portions of the first combined stream to different zones of the boiler and/or different locations within a particular zone to provide a desired heat release profile.

Figure 4:
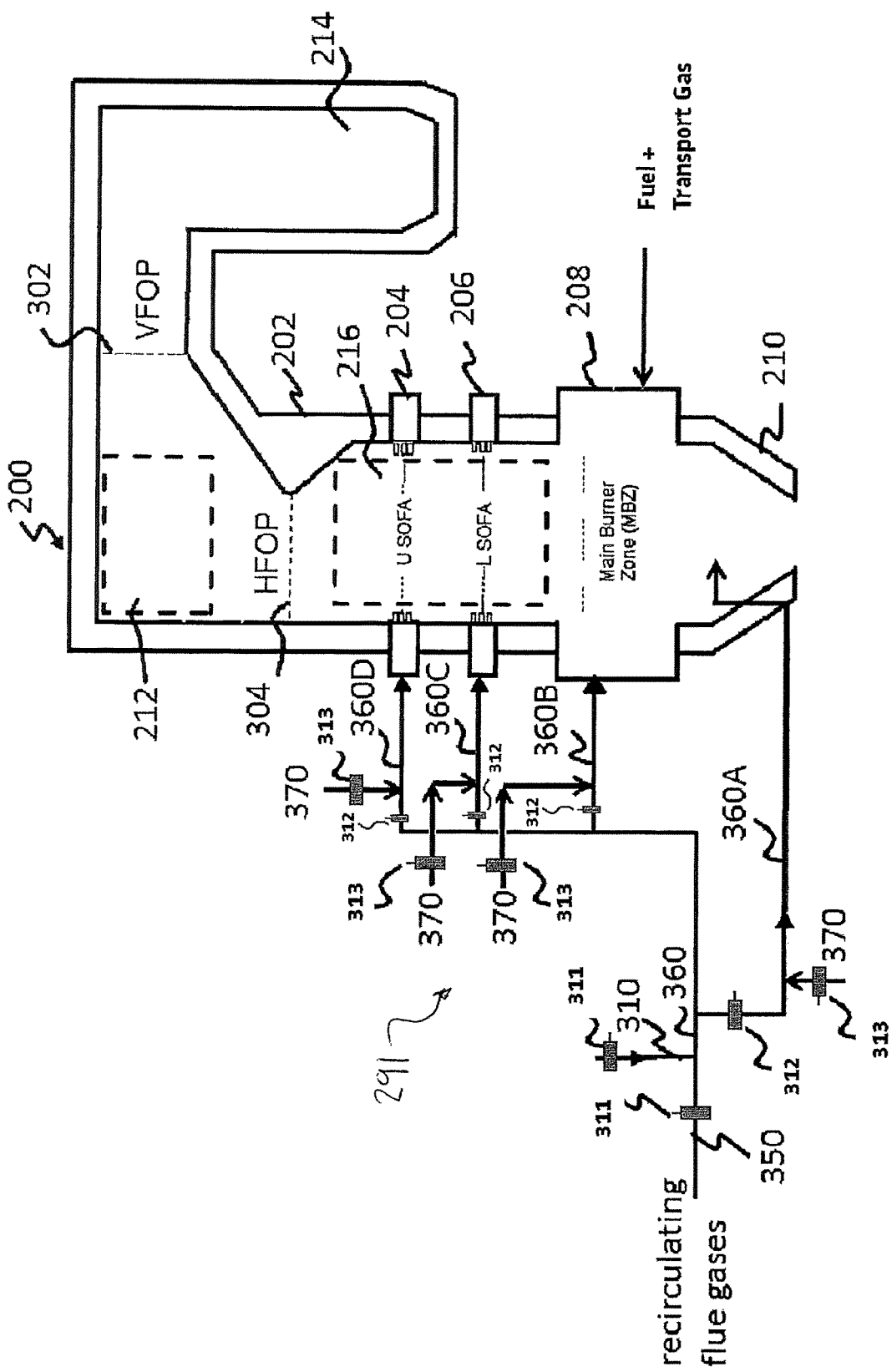
FIG. 4 is another depiction of an exemplary embodiment of introducing oxygen into the flue gas stream into the boiler.

In another embodiment similar to that shown in FIG. 4, a system and method comprises combining the first combined stream with a second oxidant stream to form a second combined stream that may be supplied to the boiler at the hopper zone, the windbox zone and/or one or more overfired oxidant compartments at different volumes amounts, wherein the volumetric flow second oxidant is controlled by a fluid flow control device. This method of enriching the first combined stream is conducted just prior to the introduction of the second combined stream into the boiler. In this system and method, the amount of oxygen to the hopper zone, the windbox zone, the hopper zone and/or the overfired oxidant compartments is varied relative to the amount of the recycled flue gas. This system and method can be advantageously used to vary the heat release pattern in the boiler.

This system and method of controlling the distribution of oxygen and/or recycled flue gas to the boiler is advantageous in that it permits localized oxygen enrichment of the atmosphere in the boiler and hence increasing the localized heat release and modifying the temperature profiles in desired areas of the boiler.

In yet another embodiment similar to that in FIGS. 3 and 4, the amount of flue gas in the combined stream may be varied instead of or n addition to varying the amount of the oxygen. In yet another embodiment, this disclosure details modulating or changing the proportion or distribution of the recycled flue gas admitted to the boiler at varying elevations relative to the furnace outlet plane. This method of controlling the flow rates of flue gases is advantageous in that it allows for maintaining a constant steam temperature control as fuel properties or furnace conditions vary. This provides a means of steam temperature control as loads vary. Another method of steam temperature control can be achieved by modulating the amount of oxygen to the varying elevations.

An advantage of the present invention the amount of oxygen and flue gas provided to a fluid stream in an oxygen fired boiler may be independently controlled to provide great flexibility to optimize the operation of the boiler and provide or modify the heat release profile of the boiler. One skilled in the art will appreciate that an increase of oxygen with an input fluid stream to the boiler will result in an increase heat flux at the location of the input fluid stream.

FIG. 3 is a depiction of a boiler 200, such as a T-fired boiler, having a control system 290 that controls the proportion or distribution of a combined stream 320 to various locations or zones of the boiler, The combined stream 320 comprises a first oxidant stream 310 (that comprises 0-100 weight % of oxygen, wherein in one embodiment stream 310 is substantially oxygen) and a second stream 350 (that comprises substantially recycled flue gases). The volumetric flow of the first oxidant stream 310 and second stream 350 are controlled by respective fluid flow control devices 311, such as baffles, fans, dampers, valves, and eductors. These flow control devices may be controlled in an open loop or closed loop control system, which will be described in greater detail hereinafter. In this embodiment, the combined stream 320 comprising a uniform oxygen concentration is introduced into the boiler 200 in different locations or zones and controllably different volumes. The boiler 200 comprises a hopper zone 210 located below the main burner zone 208 from which ash can be removed, a main burner zone 208 (hereinafter windbox 208) where an oxidant and an oxidant-fuel mixture (or alternatively a gas-fuel mixture) is introduced into the boiler 200, a burnout zone 216 where any oxygen or fuel that is not combusted in the main burner zone gets combusted, a superheater zone 212 where steam can be superheated, and an economizer zone 214 where water can be preheated prior to entering the superheater zone 212. The burnout zone 216 can utilize a lower overfired oxidant compartment 206 and an upper overfired oxidant compartment 204. The boiler 200 also comprises a horizontal boiler outlet plane 304 and a vertical boiler outlet plane 302. The boiler 200 also comprises waterwalls 202 in which the water is transformed to steam.

As noted above, a first oxidant stream 310 and a second stream 350 are combined to form the combined stream 320 that is then fed to the boiler. The combined stream 320 can comprise about 15 to about 40 volume percent oxygen, with the remainder being recycled flue gases. As can be seen in FIG. 3, the combined stream 320 can be fed to the boiler 200 into the hopper zone 210, into the windbox 208, into the lower overfired oxidant compartment 206 and/or into an upper overfired oxidant compartment 204. In other words, the combined stream 320 can be split up and distributed into several streams (320A, 320B, 320C and/or 320D) and fed into different parts of the boiler to vary the heat release profile in the boiler and to improve its thermal performance, whereby the volumetric flow rate of one or more of the streams 320A, 320B, 320C, 320D is controlled by a respective fluid flow control device 312. For example a higher percentage of the combined stream 320 may be provided to the windbox to increase the heat release profile in this zone, or vice versa. This method of enriching the second stream 350 with oxygen and splitting the combined stream 320 into different streams 320A, 320B, 320C, 320D permits varying the amount of flue gas and oxygen into different parts of the boiler to improve its thermal performance or provide a desired heat release profile.

For purposes of identification the combined stream 320 that is fed into the boiler 200 at the hopper zone 210 is identified as 320A and can comprise up to about 25 weight percent of the total weight of the combined stream 320. In one embodiment, the combined stream 320A stream can comprise about 0 to about 10 weight percent of the total weight of the combined stream 320. In another embodiment, the combined stream 320 that is fed into the boiler 200 at the windbox zone 208 is identified as 320B and can comprise about 50 weight percent to about 100 weight percent of the total weight of the combined stream 320. In one embodiment, the combined stream 320B stream can comprise about 50 to about 80 weight percent of the total weight of the combined stream 320. In yet another embodiment, the combined stream 320 that is fed into the boiler 200 at the lower overfired oxidant compartment 206 is identified as 320C and can comprise up to about 50 weight percent of the total weight of the combined stream 320. In one embodiment, the combined stream 320C stream can comprise about 10 to about 30 weight percent of the total weight of the combined stream 320.

In yet another embodiment, the combined stream 320 that is fed into the boiler 200 at the upper overfired oxidant compartment 206 is identified as 320D and can comprise up to about 50 weight percent of the total weight of the combined stream 320. In one embodiment, the combined stream 320D stream can comprise about 10 to about 30 weight percent of the total weight of the combined stream 320.

FIG. 4 depicts another embodiment of a boiler 200, such as a T-fired boiler, having a control system 291 that controls the proportion or distribution of a combined stream 360 and the oxygen ratio of each stream 360A, 360B, 360C, 360D to various locations or zones of the boiler, using a combined stream 360 and a second oxidant stream 370 to enrich or deplete the flue gas of oxygen of each respective input stream supplied to the boiler 200 to define or vary the heat release profile in the boiler and to improve its thermal performance or provide a desired heat release profile. In this embodiment, streams having different oxygen concentrations are fed to the hopper zone, the windbox zone, the upper overfired oxidant zone and the lower overfired oxidant zone. One skilled in the art will appreciate that the control oxygen concentration or ratio of each zone may be controlled in any configuration or combination of locations or zones of the boiler. The recycled flue gases 350 may be first pre-mixed with an oxidant stream 310 to form a first combined stream 360. The first combined stream 360 is then discharged towards different locations or zones of the boiler in different amounts or volume. However, each combined stream 360 is enriched with oxygen from a respective second oxidant stream 370 to provide each respective input stream 360A, 360B, 360C, 360D with the desired concentration of oxygen as well as the desired overall volumetric flow from each input stream. The ratio of oxygen in the different streams can therefore be the same or different from one another.

As shown in FIG. 4, the control system 291 controls the concentration of oxygen and volumetric flow of the combined stream 360 by controlling the fluid flow of stream 350 and oxidant stream 310 using the respective fluid flow control devices 311. The control system 291 further controls the concentration of oxygen and volumetric flow rate for each respective input stream 360A, 360B, 360C, 360D by controlling the respective fluid flow control devices 312 to control the flow of the combined stream 360 and controlling respective fluid flow control devices 313 to control the flow of respective fluid flow control devices 313. The fluid flow control device 312 may be disposed upstream or downstream of the point that the second oxidant stream 370 is added. However, when the fluid flow control device 312 is disposed upstream of the point that the second oxidant stream 370 is added, the control system 291 provides greater flexibility and concentration range to locally control both the concentration of oxygen and the overall volume of input stream 360A, 360B, 360C, 360D to the boiler. In summary as shown in FIG. 4, the fluid flow control devices 311, 312, 313 of the control system 291 can control the oxygen concentration of each input stream 360A, 360B, 360C, 360D the distribution of oxygen to each input stream and thus zone of the boiler, and the desire volumetric gas flow of each input stream.

With reference once again to FIG. 4, a first oxidant stream 310 of the total added oxygen is mixed with a second stream 350 that comprises recycled flue gases to form a first combined stream 360. In an exemplary embodiment, the first oxidant stream 310 comprises about 50 to about 95 percent of the total added oxygen, specifically about 80 to about 90 percent. The remaining percentage of oxygen necessary for the desired amount of combustion in the boiler 200 is provided in the second oxidant stream 370. Note that the recycled flue gas and the transport gas may include a small percentage of oxygen that may need to be considered in the control of the input streams 360A, 360B, 360C, 360D.

As can be seen in FIG. 4, the second combined stream 360A which comprises the first combined stream 360 and the second oxidant stream 370 comprising up to 20% of the total added is fed to the hopper zone 210. In an exemplary embodiment, the second combined stream 360A can comprise about 0 to about 18%, and more specifically about 2 to about 15% of the total added oxygen.

In another embodiment, a second oxidant stream 370 that comprises oxygen in an amount of up to 100% of the total added oxygen is combined with the first combined stream 360 and fed to the windbox 208. In an exemplary embodiment, the second oxidant stream comprises oxygen in an amount of about 50 to about 80% of the total added oxygen is combined with the first combined stream 360 and fed to the windbox 208.

In yet another embodiment, a second oxidant stream 370 that comprises oxygen in an amount of up to 50 wt % is combined with the first combined stream 360 and fed to the lower overfired oxidant compartment 206. In an exemplary embodiment, the second oxidant stream comprises oxygen in an amount of about 10 to about 30% of the total added oxygen is combined with the first combined stream 360 and fed to the lower overfired oxidant compartment 206 and/or to the upper overfired oxidant compartment 204.

The second oxidant stream 370 is generally mixed with the first combined stream 360 to form the combined stream 360A, 360B, 360C or 360D as close as possible to the boiler 200. A finer level of control over oxygen distributions can be achieved by mixing in oxygen closer to the boiler, for example adding additional oxygen at the positions depicted in FIG. 4 to locally enrich the oxygen content in one area of the windbox 208. This mode of enrichment of the first combined stream 360 can be used in the tangentially fired boilers as well as in wall fired boilers.

Figure 5:
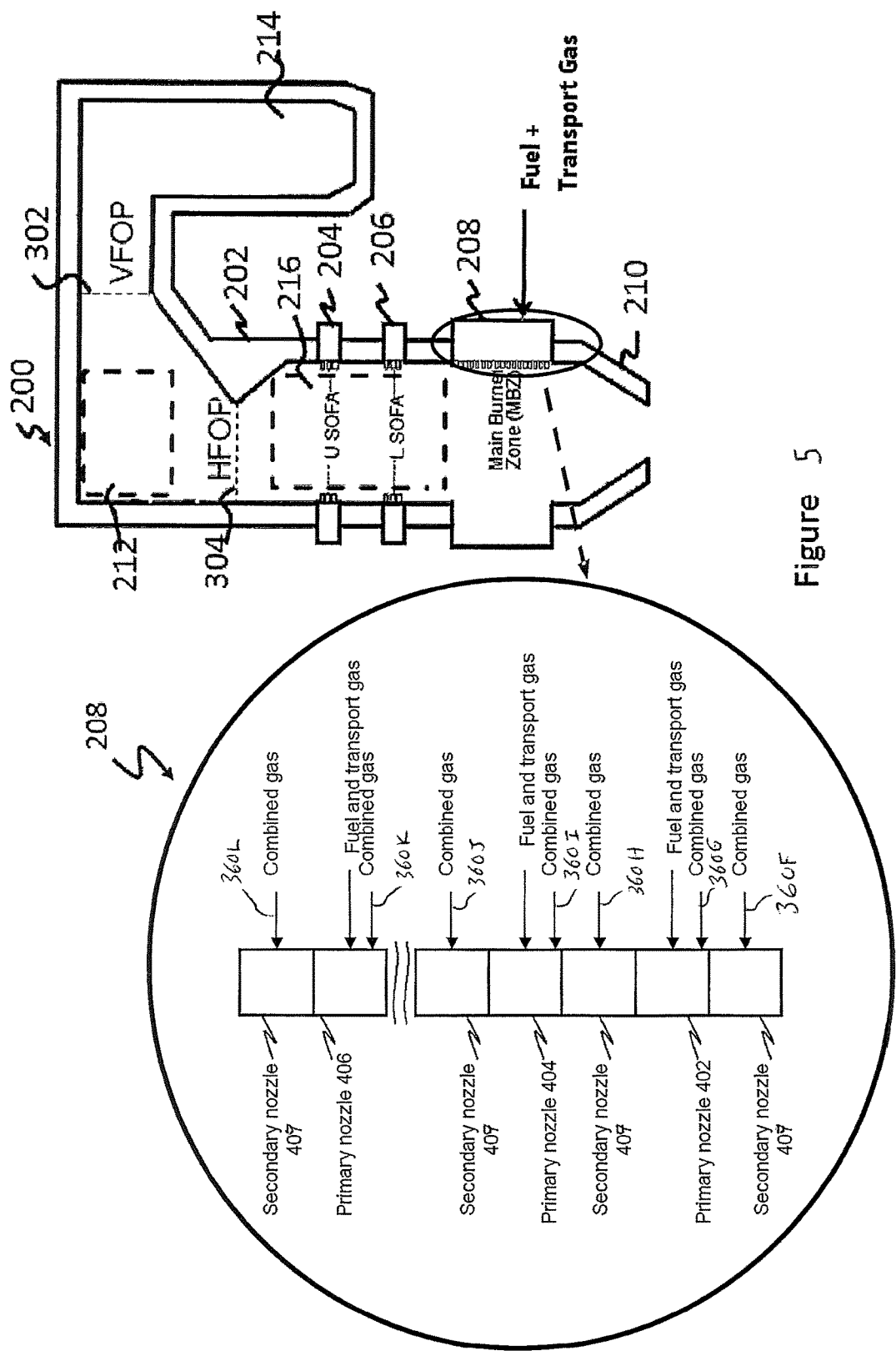
FIG. 5 represents the introduction of the combined stream into a tangentially fired boiler.

While the control systems 290, 291 of FIGS. 3 and 4 control the distribution and concentration of oxygen to particular zones of the boiler 200, the present invention contemplates that each zone having a plurality of separate input streams may also be controlled by the control systems. FIG. 5 depicts one exemplary apparatus and method of introducing the combined stream 320B (from FIG. 3) or 360B (from FIG. 4) into the windbox 208 of the boiler 200. FIG. 5 illustrates the details of the input compartments or input streams of a windbox 208 of a tangentially fired boiler, and the apparatus and method of controlling the oxygen concentration and volumetric flow of respective input streams provided by the windbox 208. Varying oxygen concentrations are introduced in different compartments of the windbox 208.

FIG. 5 depicts a plurality of assemblies, e.g. primary nozzles 402, 404, 406 and secondary nozzles 409, in the windbox 208 of a tangentially fired boiler 200. FIG. 5 contains an expanded view of the windbox 208 of the boiler 200 to illustrate a configuration of the primary nozzles 402, 404, 406 and secondary nozzles 409. In one embodiment, the windbox 208 can comprise about 2 to about 10 assemblies. Fuel and transport gas along with a mixture of recycled flue gas and oxygen (e.g., the combined stream 360B or 320B) can be introduced into the respective nozzles. In an exemplary embodiment, it is desirable to introduce the combined stream 360B (with localized oxygen enrichment) into the nozzles 402, 404, 406 and/or 407. The ratio of oxygen to the recycled flue gas in the combined stream 360B that is fed to the respective assemblies can be varied similar to the configuration shown and described in FIGS. 3 and 4. Specifically, control systems 290, 291 of FIGS. 3 and 4 may have the same configuration of fluid flow control devices to control the concentration, proportion and/or distribution of each respective input stream 360F, 360G, 360H, 360I, 360J, 360K, 360L of each nozzle 402, 404, 406, 407. In other words, the locations or nozzles (i.e. windbox zones) of the windbox 208 may be controlled in the same or similar manner as each zone of the boiler 200, whereby the input stream 360B would be functionally the same as the combined stream 360 in FIGS. 3 and 4. While this functionality has been shown for the windbox 208, one will appreciate that this level of control is contemplated by the present invention for other zones of the boiler 200.

For example, the first assembly 402 can receive a first ratio of oxygen to recycled flue gases, while the second assembly 404 can receive a second ratio of oxygen to the recycled flue gases. In one embodiment, the first ratio can be the same as the second ratio. In another embodiment, the mass ratio of the combined stream 360B to the coal fed to the first assembly 402 can be the same or different from the mass ratio fed to the second assembly 404. By changing the ratio of oxygen to the recycled flue gas, the heat release profile at different portions of the windbox can be changed. Further, the mass ratio of oxygen may also be individually controlled for the secondary nozzles 407.

Figure 6:
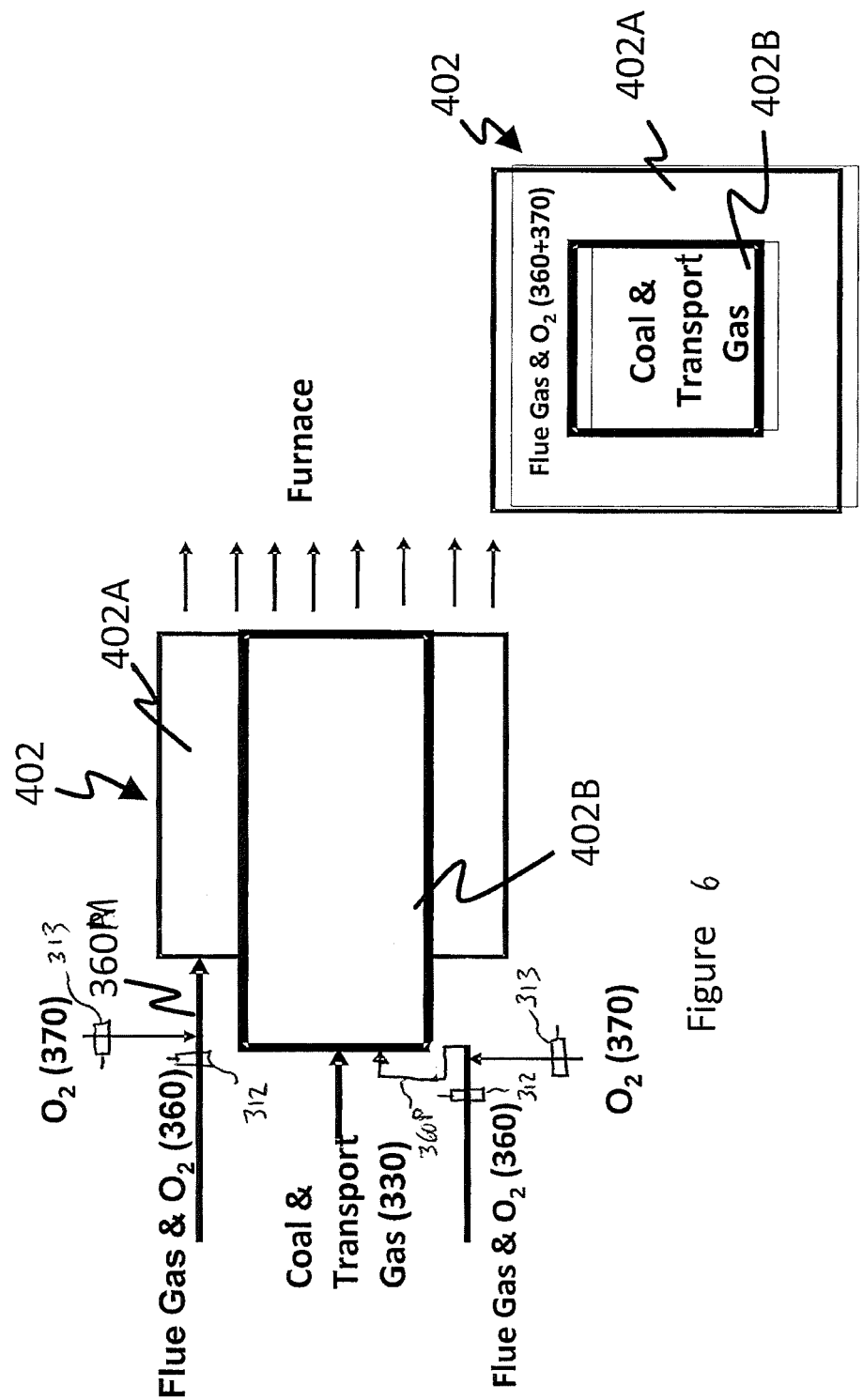
FIG. 6 reflects another exemplary embodiment where the combined stream is introduced into the windbox of a tangentially fired boiler.

FIG. 6 reflects another embodiment, in which the combined stream 360B (or 320B) can be introduced into the windbox 208 of a tangentially fired boiler via primary nozzles 402, 404 and/or 406, whereby the concentration and distribution within a respective nozzle may be controlled. The assembly 402 depicted in FIG. 6 is used as a representative primary nozzle. The primary nozzle 402 comprises an inner port 402B through which a stream of fuel (e.g., coal) and transport gas is fed into the boiler 200, and an outer annulus 402A through which a combined stream 360M is fed into the boiler. Similar to that described hereinbefore for FIGS. 3 and 4, the control systems 291, 292 may similarly control the distribution and oxygen concentration of each fluid stream 360M, 360P of the primary nozzle 402, whereby each port 402A, 402B of the nozzle 402 a zone similar to the zones of the boiler 200 described in FIGS. 3 and 4.

Further, the second combined stream 360M is introduced into the windbox 208 in annular passages 402A of the assembly 402, while the fuel and the transport gas (as that is used to transport the fuel) is introduced into the furnace via the inner port 402B, including the combined stream 360P. This arrangement permits varying or controlling the oxygen concentration in the stream 360M that surrounds the central fuel stream, which enables changes to control the heat flux and thus the heat release profile within the boiler 200, improve flame stability of the burner nozzle and reduce NOx in the boiler. The introduction of the combined stream into the annulus surrounding the fuel injection stream results in more rapid ignition and increased combustion near the fuel injection point in the boiler due to the presence of high concentrations of oxygen In one embodiment with reference to FIG. 4, the combined stream 360 and the second oxidant stream 370 may be introduced into the boiler 200 at the upper overtired oxidant compartment 204 or at the lower overfired oxidant compartment 206. The enrichment with oxygen can thus take place in the upper overfired oxidant compartment 204 relative to the lower overfired oxidant compartment 206, the windbox 208 and/or the hopper zone 210. In another embodiment, the enrichment with oxygen can take place in the lower overfired oxidant compartment 206 relative to the upper overtired oxidant compartment 204, the windbox 208 and/or the hopper zone 210. Referring to FIG. 4, one embodiment where the combined stream 360 and the secondary oxidant stream 370 is introduced into the upper or lower overtired oxidant compartment 204 or 206 respectively. The upper overfired oxidant compartment 204 is closest to the horizontal boiler outlet plane 304, while the lower overfired compartment 206 is the compartment farthest from the horizontal boiler outlet plane 304.

When the combined stream 360 is introduced into the lower overfired oxidant compartment 206, the second oxidant stream 370 is introduced into the upper overtired oxidant compartment 204 and vice versa. By introducing the combined stream 360 into the lower overfired oxidant compartment 206, the oxidant stream in the lower overfired oxidant compartment 206 is enriched in oxygen relative to the upper overfired oxidant compartment 204, the windbox 208 and the inlet header zone 210.

Sufficient oxygen is used in the overfired oxidant compartments so that the combustion process may continue from the lower boiler while allowing for the lower boiler to operate at a ratio of oxygen to fuel lower than the stoichiometric ratio than the combustion process requires. The purpose of enriching the flue gas stream to the overfired oxidant compartments is to control the amount of nitrogen oxides (NOx) formed as well as to control the temperatures in the lower furnace.

Referring to FIG. 4, another embodiment related to varying oxygen concentrations in the upper and lower overfire oxidant compartments 204 and 206 may be illustrated. The oxygen concentration of the upper overtired oxidant compartment 204 can be depleted relative to the bulk of the second oxidant stream 350 by the introduction of supplemental flue gas recirculation stream 380 to the upper overfired oxidant compartment 204. Furthermore, depletion of the upper overtired oxidant compartment 204 relative to the bulk of the secondary oxidant stream 370 may be accomplished by introducing the combined stream 360 into the lower overfired oxidant compartment 206 and/or the windbox 208. In one embodiment, the second oxidant stream 370 can be introduced into the windbox 208, while the supplemental flue gas recirculation stream 380 is fed to the upper overfired oxidant compartment 204.

Upper overtire oxidant compartments depleted in oxygen relative to the global oxygen concentration (i.e., 15 to 40 wt %) will allow for higher combustion temperatures and result in higher heat transfer rates in the lower portions of the boiler where there is a lower working fluid temperature, while decreasing the combustion temperature and resultant heat transfer rates higher in the boiler.

Due to the energy required to increase the temperature of the upper overtire oxidant, the temperature of the combustion gases will decrease (most of the combustion will have been completed). At a decreased temperature of the combustion gases, the resultant flux to the boiler walls in the portion of the boiler closest to the outlet plane will decrease. The resulting alteration in the heat transfer profile will be beneficial for waterwall materials, in particular for supercritical steam generators. The primary benefit is to reduce the heat transfer in the boiler close to the boiler outlet plane where the working fluid temperatures are highest.

The use of the additional oxygen has a number of advantages. Adding oxygen to the oxidant stream located below the lowest burner assembly alters the heat absorption profile in the boiler. The ability to alter and control the heat absorption profile can increase utilization of heat transfer surfaces located in the lower boiler. This allows for more total heat absorption in the radiant section of the boiler. This could also reduce peak temperatures and heat transfer rates which generally occur above the windbox, and thereby reduce material requirements and the potential for ash slagging problems.

Altering the heat release profile in the boiler can decrease peak boiler material temperatures at a constant thermal heat input and the flue gas recirculation rate. The advantage is that flue gas recirculation rates can be lowered without peak heat fluxes that cause slagging problems and/or waterwall tube overheating. Another beneficial result of altering of the heat release profile in the boiler is to allow for a more efficient utilization of the heat transfer surface. The benefits for a retrofit boiler is an increase in thermal heat input and thus working fluid power, while for a new boiler it results in a decrease in boiler size.

A further beneficial result is an improvement in emission characteristics, including carbon monoxide emissions, excess oxygen required, unburned carbon, and mineral matter properties. Another result is a beneficial impact on ash fouling properties in the convective section of the boiler, by controlling the boiler outlet temperature. Yet another advantageous result is a beneficial impact on ash slagging properties in the lower section of the boiler. Another benefit is that ductwork used in the first combined streams 360 to the boiler do not need to tolerate increased oxygen concentrations. The benefit being that ductwork can be constructed from a wider variety of materials thereby decreasing cost. Only the shorter ductwork containing the second combined streams 360A, etc need tolerate higher oxygen concentrations after mixing with the second oxidant stream 370. Another benefit for retrofit applications is utilizing existing plant ductwork.

The control systems 290, 291 of the present invention may be an open loop system, whereby fluid flow control devices are adjusted or set at predetermined settings or set by an operator, or may be a closed loop system. As a closed loop system, the fluid flow control devices may be adjusted or set in response to an operation and/or conditional parameter of the boiler and/or boiler island. For example, the fluid flow control devices may control the fluid flow in response to thermal parameters of the boiler or boiler island such as steam temperature, boiler temperature, or other thermal zones of the boiler or boiler island. Similarly the fluid flow control devices may control fluid flow in response operational parameters such as system load or changes to the load of the boiler or boiler island. The present invention contemplates that a processor or DCS may provide a respective control signal to a respective fluid flow control device in response to a sensed input signal, such as an operational or system condition parameter.

Figure 7:
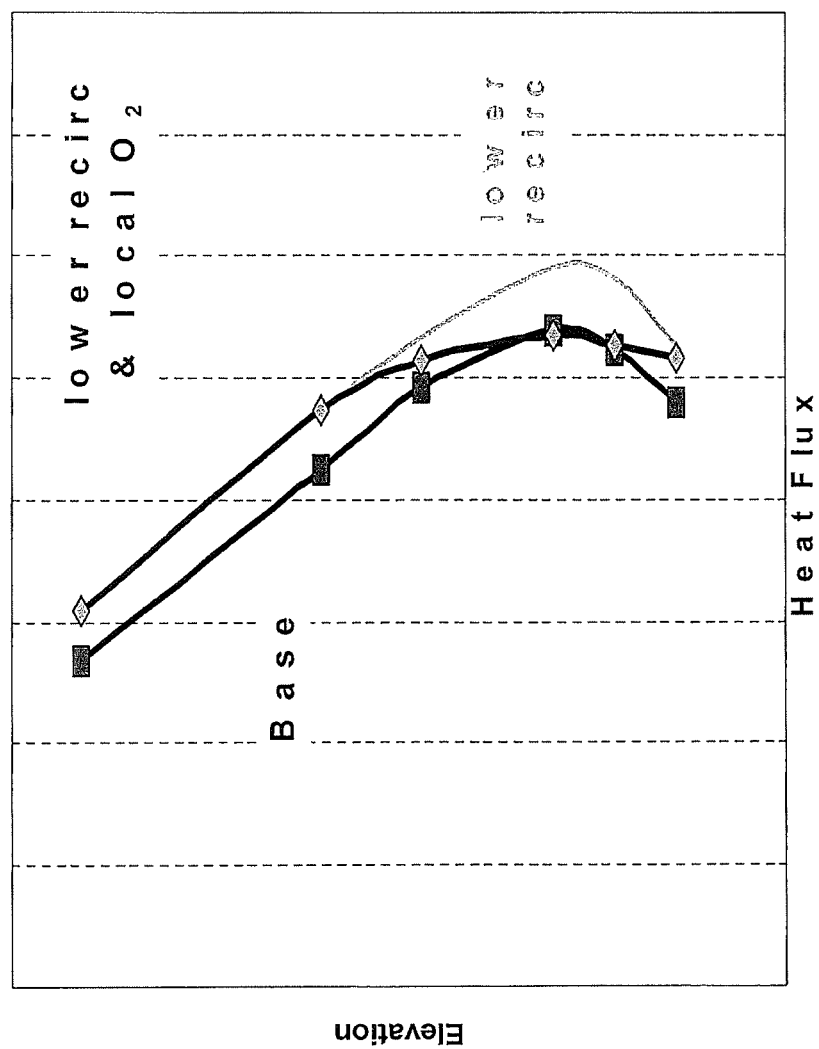
FIG. 7 is a graph showing how the heat flux profile can be varied by varying the recirculation rate and by varying the distribution of oxygen to the boiler.

FIG. 7 illustrates an example of the changes to the heat release pattern that can be achieved by varying the flue gas recirculation rate and the location of oxygen addition. Three curves are shown in FIG. 7, representing three test conditions tested in a 15 MW pilot plant. The base case shows the measured heat flux to the walls of the furnace at several different elevations. The heat flux is higher in the main burner zone (208 in FIG. 4 for example) and decreases at higher elevations. Note that the heat flux pattern that is measured corresponds directly to the heat release pattern in the furnace. The curve for lower recirculation shows the case for a lower amount of flue gas recirculation. In this case, the temperatures are higher at each elevation, and therefore the heat flux is higher at each elevation.

The third curve for lower recirculation and local $O_2$ shows the case with the same reduced flue gas recirculation as in the second curve along with varying the oxygen added at each elevation to adjust the shape of the heat flux profile. In this case, the maximum, or peak, heat flux in the main burner zone was reduced back down to the value of the base case. An advantage for this example is the ability to operate with reduced flue gas recirculation while avoiding peak heat fluxes that may exceed a design limit and cause overheating of the boiler materials. Other combinations of varying the overall flue gas recirculation and the amount of flue gas and oxygen added at each elevation can achieve other variations to the shape of the heat flux profile.

The present invention contemplates that the features of nozzle tilt described hereinbefore may be used in combination of the present invention to provide a greater range of control of the boiler at, for example lower loads.

This invention providing control of the heat release pattern in a boiler can be used for a variety of applications and improvements in the boiler design, operation and control. Some of these include Reduction in the total amount of flue gas recirculation back to the oxy-combustion boiler resulting in lower capital equipment costs and lower operating costs for both oxyfuel retrofit of existing plants and new oxy fuel plants Upgrade in steam generation capacity of an existing boiler for an oxyfuel retrofit Reduction in size and cost of a new boiler for oxyfuel applications for improved control of steam generation and steam temperatures during oxy-fired boiler operation Active control (both open and closed loop control) of the amount of steam generated (flow) and the temperature of the steam from the oxyfuel boiler. This includes control over the steam flow and temperature during load changes, variations in boiler resistance to heat transfer, and fuel variations. Further, it can be used in combination with other traditional methods, such as tilting of tangential fuel nozzles, and/or the total amount of gas recycle flow injected, to expand the range of control.

There are several possible applications to use the reduced flue gas recycle flow. For example, for a new oxyfuel unit, the boiler waterwall surface may be made smaller for the same heat transfer duty as a result of the increased overall furnace heat flux. Downstream of the boiler, the ductwork, gas recirculation system, and pollution control equipment can all be smaller in size with a lower capital cost. With lower gas recycle, the parasitic power for recirculation fans is also reduced. The amount of surface in the upper boiler and the backpass may also be designed to accommodate the reduced flue gas flow rate.

For example, for a retrofit application of an existing subcritical steam boiler, more surface can be added to the upper boiler section to achieve the desired superheat and reheat heat duties from the reduced flue gas flow. Downstream of the boiler, the ductwork, gas recirculation system, and pollution control equipment can all be smaller with a lower capital cost. With lower gas recycle, the parasitic power for recirculation fans is also reduced. In addition, for a retrofit application of an existing supercritical steam boiler, additional surface may not be necessary to achieve the desired superheat and reheat heat duties from the reduced flue gas flow and obtain resulting benefits.

Boiler capacity can also be upgraded by optimizing the distribution of oxygen and recycled flue gas. Applying the same idea and approach to shape and control boiler heat flux profile, the steam generation capacity can be increased at the same level of gas recirculation and gas flow through the system. In one embodiment, for a retrofit application, more fuel may be fired and more steam produced. This increased steam production, with additional surface added to the upper boiler section to achieve the desired superheat and reheat heat duties, may be used to produce more electric power than a comparative boiler where no supplemental oxygen is used if the steam turbine is also upgraded.

In another embodiment, for a retrofit application, more fuel may be fired and more steam produced. As an alternative to increasing gross electric generation, the extra steam could be used in other parts of the oxyfuel plant. For example, the air separation unit and the gas processing unit each utilize compressors that could be powered with steam-drives using this steam. This would reduce the parasitic electric power consumed by plant equipment and increase the net electric power.

Active control the temperature of steam leaving the boiler can be achieved by modulation of the individual oxidant streams (FIG. 4, Stream 370A, 370B, 370C, 370D). For example, using a traditional fuel nozzle tilting control system, as the boiler waterwalls foul, less heat is absorbed resulting in higher gas temperatures entering the downstream sections, which could cause several operational problems. By tilting the nozzles down, the hot gases are exposed to more of the lower boiler waterwall surface, When the walls are cleaned, the nozzles are tilted up to again maintain proper heat absorption. Similar control can be obtained by modulating the flow rate of oxidant streams to change the distribution of the oxygen into the boiler. By increasing flow of the oxidant streams lower in the boiler (such as in FIG. 5, Main Burner Zone lower Windbox compartments) while decreasing the oxidant flows in upper portions results in increasing the heat transfer and lowering the gas exit temperature. Conversely, if less heat absorption was desired in the lower boiler, for example if steam outlet temperatures were too low, then decreasing oxidant flow in the lower boiler and increasing the oxidant flow in the upper portion (such as in FIG. 5 overtire compartments LSOFA and USOFA) resulting in higher gas temperatures downstream sections and increased steam temperature. Control over the gas temperature leaving the boiler is important during pulverized fuel firing—if gas temperatures go above design conditions, overheating and/or severe fouling of downstream tube sections can occur. If gas temperatures are below design conditions, then steam temperatures may not reach desired temperatures.

Figure 9:
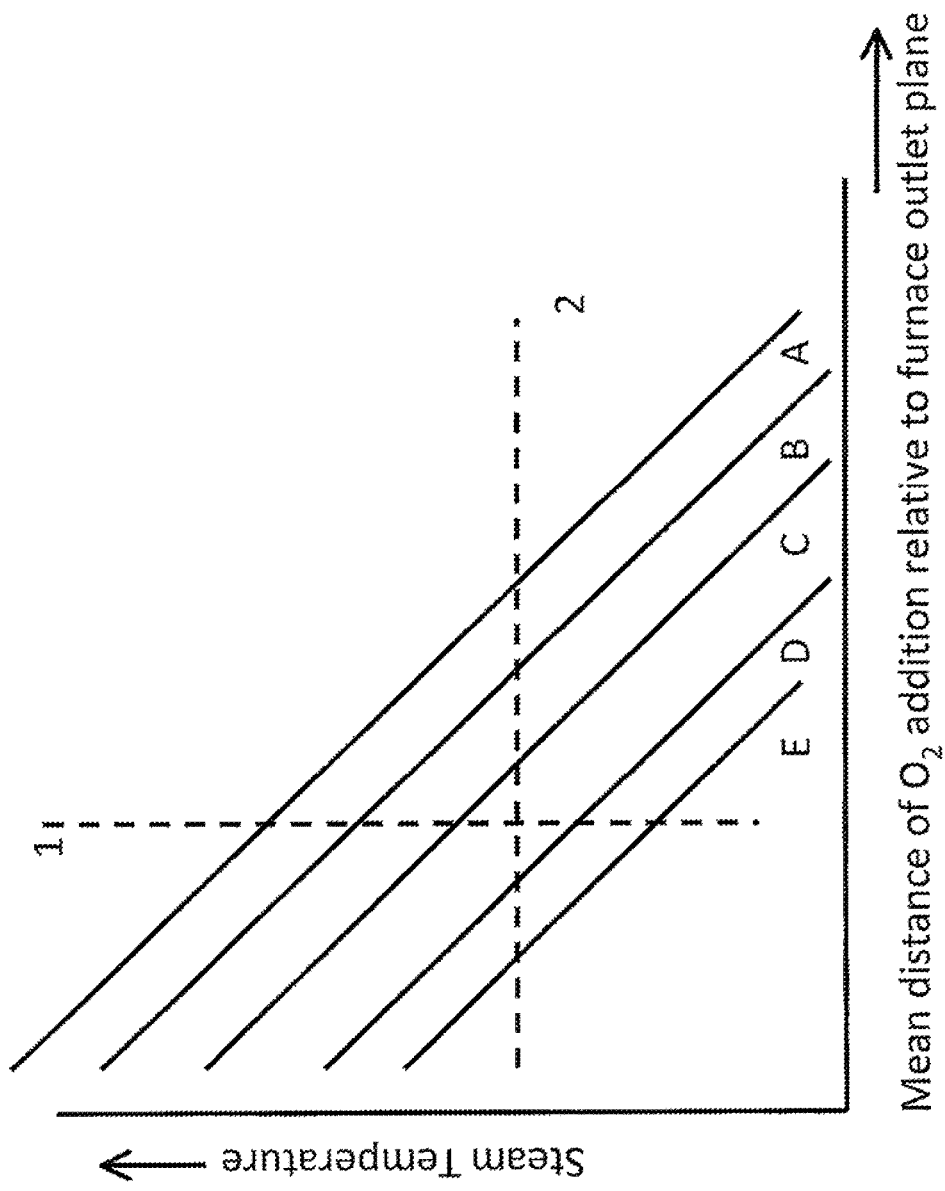
FIG. 9 is a graph depicting modulating the distribution of oxygen addition admitted to oxidant streams that enters the boiler at varying elevations relative to the furnace outlet plane.

FIG. 9 represents the concept of modulating the distribution of oxygen addition admitted to oxidant streams that is introduced into the boiler at varying elevations relative to the furnace outlet plane (FIG. 4, HFOP). The lines A, B, C, D, and E represent varying levels of resistance to heat transfer as represented by different boiler wall slagging conditions. If no operation adjustments are made as the resistance level shifts, the steam temperature will shift, as represented by line 1. Line 2 represents the concept of this invention, as resistance level varies from A to E the distribution of oxygen addition admitted to oxidant streams, which enters the boiler at varying elevations relative to the furnace outlet plane follows along line 2 to maintain a constant steam temperature. This would also allow for constant steam temperature control as fuel properties or furnace conditions vary.

The steam temperature can be also controlled as loads (fuel input) vary by modulating the distribution of oxygen introduced into the boiler. Modulating the distribution of oxygen introduced into the boiler can also be used in combination with other control methods to expand the range of steam temperature control.

Changing the quantity of recycled flue gas returned to the combustion chamber changes the temperature and energy of gas to convection pass, which changes the cooling rate of gas and the convection section heat flux profile. Control over the gas temperature leaving the boiler is important during pulverized fuel firing. If the temperature at this location goes above the ash softening or ash fusion temperature, severe fouling may occur and excessive soot blowing will have to be conducted, decreasing the efficiency and availability of the plant. Furthermore as the heat transfer profile in the convective pass changes it could cause tubes to overheat in some locations. A combustion system that would allow for independent control of the temperature and energy flow rate to the convective pass would therefore be of benefit. Traditional means of varying flue gas recirculation flow rate for steam temperature control does not allow for independent control of the temperature and energy flow rate to the convective pass.

By application of this in the boiler steam conditions can be controlled by modulating the proportion of the recycled flue gas that enters with the oxidant streams into the boiler at varying elevations relative to the HFOP. At a constant flue gas recirculation rate, as the distribution of recycle gas is varied, the heat absorption pattern in the boiler shifts. This method of control comprises modulating the distribution of flue gas recycle between the windbox and the amount of oxidant utilized in the overfire compartments. As the distribution of recycle gas addition shifts between the windbox and the overfire compartments, the heat absorption profiles in the boiler will shift, allowing operational control of steam conditions leaving the boiler.

Figure 8:
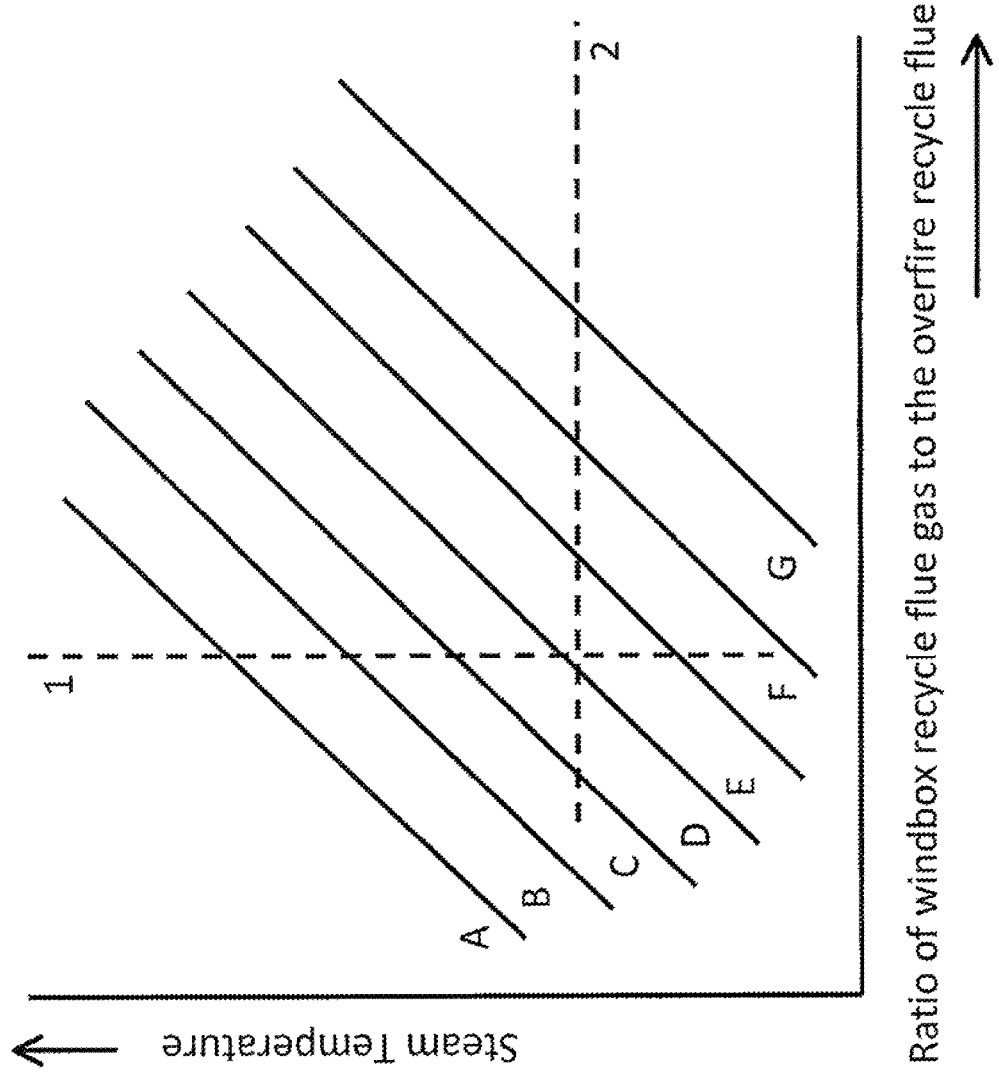
FIG. 8 is a graph that depicts the effects of modulating the proportion of the recycled flue gas admitted to the boiler at varying elevations relative to the furnace outlet plane.

FIG. 8 is a graph that depicts the effects of modulating the proportion of the recycled flue gas admitted to the boiler at varying elevations relative to the furnace outlet plane and the impacts of varying heat transfer resistance in the furnace. If no operation adjustments are made as the resistance level shifts, for example as ash deposition on the furnace walls increases, the steam temperature will shift, as represented by line 1. Line 2 represents the concept of this invention, as resistance level varies from A to G, the ratio of windbox recycle to overfire recycle follows along line 2 to maintain a constant steam temperature. This method of controlling the flow rates of flue gases is advantageous in that it allows for maintaining a constant steam temperature control as fuel properties or furnace conditions vary.

This approach can also provide a means of steam temperature control as loads (fuel input) vary by modulating the distribution of gas recycles introduced into the boiler. As the load varies there is a desire to change the distribution of heat absorption pattern to meet the desired steam conditions. Modulating the distribution of gas recycle introduced into the boiler can also be used in combination with other control methods to expand the range of steam temperature control.

While the present invention has provided an embodiment for a tangentially fired boiler, one will appreciate that the present invention may be used for any oxygen fired boiler, including an oxygen wall fired boiler.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

While the invention has been described with reference to a preferred embodiment and various alternative embodiments, it will be understood by those skilled in the art that changes may be made and equivalents may be substituted for elements thereof without departing from the scope of invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of controlling the operation of an oxy-fired boiler; the method comprising:
   providing a fuel and transport gas stream to a main burner zone of a boiler;
   combusting the fuel from the fuel and transport gas stream in the boiler;
   discharging flue gas from the boiler;
   recycling a portion of the flue gas to the boiler;
   combining a first oxidant stream with the recycled flue gas to form a combined stream;
   splitting the combined stream into a plurality of independent split streams;
   introducing each independent split stream at a different elevation of the boiler;
   controlling independently an oxygen concentration of each of the independent split streams by adding a second oxidant stream to each respective independent split stream to form respective independent oxygen enriched split streams;
   introducing at least one of the independent oxygen enriched split streams into an array of nozzles associated with a designated zone of the boiler; and
   controlling independently an oxygen concentration at each of the nozzles in the array of nozzles;
   wherein the combined stream, the independent split streams, and the independent oxygen enriched split streams are separate from the fuel and transport gas stream; and
   wherein combining the first oxidant stream with the recycled flue gas to form the combined stream prior to splitting the combined stream into the plurality of independent split streams provides a uniform oxygen concentration in each of the independent split streams for introduction into the boiler in the event the second oxidant stream is not added to each respective independent split stream.

2. The method of claim 1, wherein the boiler is a tangentially fired boiler.

3. The method of claim 1, wherein the controlling independently the oxygen concentration of each split stream introduced to the boiler further includes changing a heat absorption in the boiler to a desired heat absorption pattern.

4. The method of claim 1, wherein at least one respective split stream is introduced into the boiler at a hopper zone located below a wind box.

5. The method of claim 1, wherein at least one of the split streams is introduced into the boiler in a lower portion of a wind box.

6. The method of claim 5, wherein the at least one split stream that is introduced into the boiler in the wind box is at least 50 weight percent of the combined stream.

7. The method of claim 1, wherein at least one split stream is introduced into the boiler in a lower portion of an overfire compartment.

8. The method of claim 1, wherein at least one split stream is introduced into the boiler in an upper portion of an overfire compartment.

9. A method comprising:
   providing a fuel and transport gas stream to a main burner zone of a boiler;
   combusting the fuel from the fuel and transport gas stream in the boiler;
   discharging flue gas from the boiler;
   recycling a portion of the flue gas to the boiler;
   combining a first oxidant stream with the recycled flue gas to form a first combined stream;
   splitting the first combined stream into a plurality of independent split streams;
   adding a second oxidant stream to each respective independent split stream provided to the boiler to form respective independent oxygen enriched split streams;
   introducing a least one independent oxygen enriched split stream to an array of nozzle assemblies associated with a designated zone of the boiler; and
   controlling independently at least one of a concentration and distribution of oxygen in an input stream to the boiler from each nozzle assembly within the array of nozzle assemblies to vary the heat release profile of the boiler;
   wherein the first combined stream, the independent split streams, and the independent oxygen enriched split streams are separate from the fuel and transport gas stream; and
   wherein combining the first oxidant stream with the recycled flue gas to form the first combined stream prior to splitting the first combined stream into the plurality of independent split streams provides a uniform oxygen concentration in each of the independent split streams for introduction into the boiler in the event the second oxidant stream is not added to each respective independent split stream.

10. The method of claim 9, wherein the boiler is a tangentially fired boiler.

11. The method of claim 9, wherein the adding the second oxidant stream to form the respective oxygen enriched split streams is conducted at a position proximate to a point of entry into the boiler.

12. The method of claim 9, wherein the respective split streams are sequentially introduced into the boiler.

13. The method of claim 9, wherein at least one respective oxygen enriched split stream is introduced into the boiler at a hopper zone located below a windbox.

14. The method of claim 13, wherein the oxygen enriched split stream introduced into the boiler at the windbox comprises at least 50 wt % oxygen, based on the total weight of the stream.

15. The method of claim 13, wherein each oxygen enriched split stream is introduced into the boiler via an annular space disposed around an inner port, where the inner port introduces fuel and transport air into the boiler.

16. The method of claim 1, wherein each respective oxygen enriched split stream is introduced into the boiler via an annular space disposed around an inner port, where the inner port introduces fuel and transport air into the boiler.

17. The method of claim 9, wherein the boiler is a wall fired boiler.

18. The method of claim 9, wherein the controlling independently the oxygen concentration of each respective oxygen enriched split stream introduced to the boiler changing a heat absorption in the boiler to a desired absorption pattern.

19. The method of claim 13, wherein the oxygen enriched split stream introduced into an overfire compartment at the hopper zone comprises up to 50 wt % oxygen based on the total weight of the oxygen enriched split stream.

20. The method of claim 1, further comprising the step of:
controlling independently the volumetric flow of each of the split streams introduced to the boiler.

21. The method of claim 1, wherein at least one respective split stream is introduced into the boiler at a windbox.

22. The method of claim 1, wherein at least one respective split stream is introduced in an overfire compartment located above a windbox.

23. The method of claim 1, wherein at least one respective split stream is introduced into the boiler at a hopper zone located below a windbox, at the windbox and in an overfire compartment located above the windbox.

24. The method of claim 1, wherein at least one respective split stream is introduced into the boiler at a windbox and in an overfire compartment located above the windbox.

25. The method of claim 9, wherein at least one respective oxygen enriched split stream is introduced into the boiler at a windbox.

26. The method of claim 9, wherein at least one respective oxygen enriched split stream is introduced in an overfire compartment located above a windbox.

27. The method of claim 9, wherein at least respective oxygen enriched split stream is introduced into the boiler at a hopper zone located below a windbox, at the windbox and in an overfire compartment located above the windbox.

28. The method of claim 9, wherein at least one respective oxygen enriched split stream is introduced into the boiler at a windbox and in an overfire compartment located above the windbox.

29. The method of claim 9, further comprising:
controlling independently the volumetric flow of each respective split stream introduced to the boiler.

30. The method of claim 9, wherein the first oxidant stream and second oxidant stream are provided from a common source.

31. A method comprising:
providing a fuel and transport gas stream to a main burner zone of a boiler;
combusting the fuel from the fuel and transport gas stream in the boiler;
discharging flue gas from the boiler;
recycling a portion of the flue gas to the boiler;
combining a first oxidant stream with the recycled flue gas to form a first combined stream;
splitting the first combined stream into a plurality of separate independent split streams;
introducing at least one of the plurality of independent split streams into an array of nozzle assemblies associated with a designated zone of the boiler; and
controlling independently an oxygen concentration within at least one of the nozzle assemblies within the array such that the oxygen concentration within at least one nozzle assembly within the array is different from the oxygen concentration of another nozzle assembly within the array,
wherein combining the first oxidant stream with the recycled flue gas to form the first combined stream prior to splitting the first combined stream into the plurality of independent split streams provides a uniform oxygen concentration in each of the independent split streams for introduction into the boiler.

* * * * *